Aug. 14, 1928.

A. F. SHORE 1,680,436

CLIP FOR LAMINATE SPRINGS

Filed Aug. 24, 1923

INVENTOR
Albert F. Shore
BY
Geo. Hoffman
ATTORNEY

Patented Aug. 14, 1928.

1,680,436

UNITED STATES PATENT OFFICE.

ALBERT F. SHORE, OF NEW YORK, N. Y.

CLIP FOR LAMINATE SPRINGS.

Application filed August 24, 1923. Serial No. 659,061.

This invention relates to improvements in clips for laminate springs, such for example as those used to suspend automotive and other vehicles, and it has for its object the provision of a spring-pressure clip of this character having side-guiding means adapted to retain the spring laminations in alignment, and also having means for applying yielding, binding pressure upon such leaves or laminations to produce a predetermined degree of frictional contact between the plane surfaces thereof, thereby materially reducing the amplitude of vibrations and particularly of the larger vibrations, this construction serving to increase the effective strength of the spring and its resistance to deflection and being especially effective when used in connection with springs of the softer type or springs having a comparatively long period of vibration.

Another object of the invention is the provision of a yielding pressure device as described, adapted to prevent excessive play between the spring laminations bound thereby and excessive separation of the leaves.

Another object of the invention is to provide a device as described having convex contacting faces adapted to press against the plane faces of the spring laminations and to rock thereon upon relative longitudinal movement of the leaves.

A further object of the invention is to provide a spring-pressure clip as described having seating means adapted to prevent pivotal movement of the clip to eliminate undue wear of the parts.

Another object of the invention is to provide an improved check for the recoil of the spring, the device herein serving by its predetermined yielding rolling pressure to prevent undue strain upon the leaves upon recoil, thus lessening the danger of breakage of said leaves.

These and other objects of the invention not hereinbefore referred to will be hereinafter described and claimed and are illustrated in the accompanying drawing, in which:

Similar characters designate like parts in all the figures of the drawing.

Figure 1:
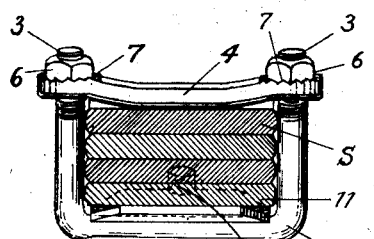
Figure 1 is a cross section of a laminate spring having my improved spring clip applied thereto.
Figure 2:
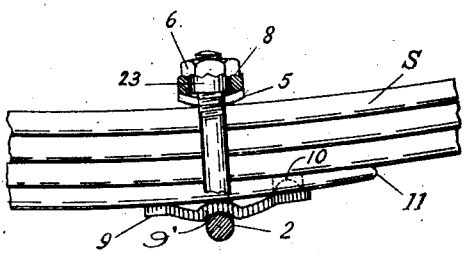
Fig. 2 is a side elevation of the same, looking from the left of Fig. 1, with a portion of the spring being broken away.
Figure 3:
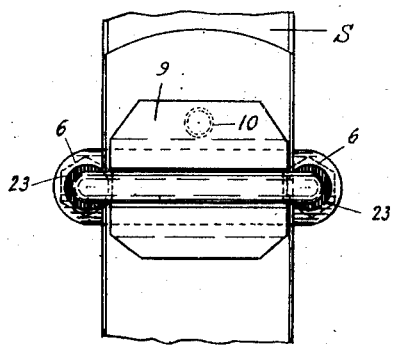
Fig. 3 is a bottom plan view.

Referring to the drawing, Figs. 1, 2 and 3 illustrate one embodiment of my invention, in which a yoke-shaped member, of proper form and dimensions for surrounding and engaging the leaves of the spring S, is shown at 2. This yoke is here illustrated as formed of material of cylindrical cross section, and the ends thereof are threaded at 3. It is, of course, understood that the yoke may be formed of material that is flat, or of other cross-sectional form. A bar or plate 4, of resilient material, preferably spring steel, is provided with openings therein near its extremities adapted to receive the ends 3 of the transverse yoke 2, said bar being also adapted to be pressed down upon the facing leaf of the spring S to secure any desired predetermined degree of pressure and consequent friction upon the surfaces of the spring and between its laminations. This connecting spring-pressure bar 4 is bowed to provide a convex pressure surface intermediate its ends and its contacting face is also of convex form from side to side, as shown at 5, this construction permitting, when the nuts 6 are threaded onto the ends of the yoke at 3, any desired binding pressure of the member 4 on the leaves. To prevent loosening of the nuts from vibration, after they have been set, the bar 4 is shown as formed with radial serrations 7 surrounding the openings therein, and these serrations cooperate with similar serrations 8 on the under side of the nuts 6. It will be understood that these serrations are so fashioned as to permit not only fastening of said nuts but also ready removal thereof.

For the purpose of locking the clip against movement longitudinally of the spring leaves I have shown herein an adapter plate or saddle 9 formed with a projection 10 adapted to coact with a depression in the leaf 11 to anchor the clip to the spring.

This depression may be somewhat larger than the complementary projection to obviate entrance of grit and prevent excessive wear of the parts. The adapter plate 9 may or may not be of the snap-in type, and is formed with a bearing seat 9' for the yoke 2 transverse the spring, said seat preferably having a curved surface described with a radius greater than that of said yoke in order to permit free rocking of the yoke therein and eliminate sliding or turning motion, thereby preventing excessive wear of the contacting surfaces.

Figure 5:
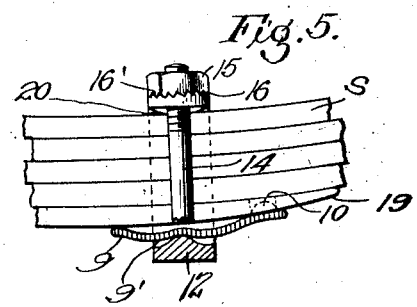
Fig. 5 is a side elevation of the same, looking from the left of Fig. 4, with only a portion of the spring shown.
Figure 4:
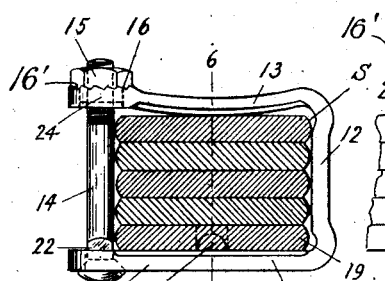
Fig. 4 is a modified form of the clip shown in Fig. 1.
Figure 6:
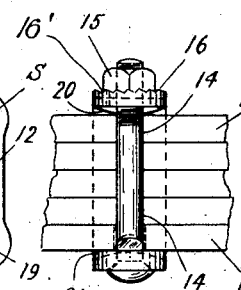
Fig. 6 is a side elevation, looking from the left of Fig. 4, only a portion of the laminations being shown.
Figure 7:
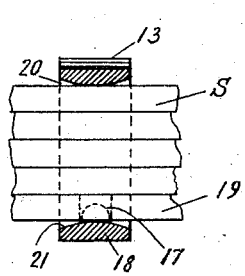
Fig. 7 is a cross section taken on the line 6—6, Fig. 4.

Referring to Figs. 4, 5 and 6, I have shown herein a modification of my invention in which a yoke 12 is employed, one arm 13 of which is bowed in form to adapt it for contact with the surface of the spring S. The yoke 12 is shown herein as formed from flat stock and is of resilient material, as spring steel, and has therein eyes or openings at its ends through which a connector, here shown as a bolt 14, may be inserted, said bolt being screw-threaded in an ordinary manner to adapt it to receive the binding nut 15. Upon manipulation of this connector 14 and nut 15 to obtain the desired pressure upon the spring, serrations 16 on the arm 13 of the yoke, in cooperation with the complementary serrations 16' on the under face of the nut 15 or its equivalent, as a bolt-head, furnish the means for locking the clip upon the spring. As in the embodiment of my invention shown in Figs. 1, 2 and 3, these complementary serrations are so fashioned that they not only prevent loosening of the nut 15 from vibration but fasten and lock said nut in position in such manner as to permit ready removal thereof. A protuberance 17 formed or fastened on the arm 18 of the yoke is shown for coaction with a complementary depression in the leaf 19 to assure anchoring the clip to the spring to prevent longitudinal movement of the clip relatively thereto. This same result may also be obtained by applying the adapter-plate arrangement shown in Fig. 2 and above described in connection with the embodiment of my invention illustrated in Figs. 1, 2 and 3. This plate is similarly provided with a projection 10 which co-acts with a depression in the leaf 19 for anchoring the yoke 12 to the spring S. As in Fig. 2, this depression may be somewhat larger than the projection, to prevent entrance of grit and hence excessive wear on the parts. The plate 9 has a bearing seat 9' for the yoke 12 transverse of the spring S. This bearing seat preferably has a curved surface with a radius greater than that of the yoke 12, to permit free rocking of the yoke therein and also for the purpose of eliminating sliding or turning motion, thus avoiding excessive wear of the contacting surfaces. The inner contacting faces of the arms 13 and 18 are convex from side to side, as shown at 20 and 21, in order to permit rocking movement of the clip on the spring after the spring and clip are bound together under any desired predetermined yielding pressure. I have shown the bolt 14 squared at 22 to prevent turning thereof in the opening of the arm 18, although, as a substitute, a screw-thread may be provided in the eye of the arm 18, and only an ordinary screw with a serrated shoulder in place of the bolt 14 and nut at 15.

The nuts 6—6 in Figs. 1, 2 and 3 and the nut or head 15 in Figs. 4, 5 and 6 will preferably be hexagonal with a depending cylindrical portion 23 and 24 of less diameter, adapted to fit snugly within the openings in the spring bars 4 and 13, respectively.

Laminated springs ordinarily are made up of parallel leaves of even thickness from end to end. Some springs, however, are made up of leaves which taper in thickness toward their ends, so that the spring as a whole shows considerable taper. In this case, it is desirable to provide a seat for the clip having a concave depression or groove therein so that the bottom thereof will present a surface substantially parallel with the surface on the opposite side of the assembly. This means that the clip will be retained at right-angles to the parallel or main leaf, whereas otherwise it would be somewhat slant. The result of such slant would be to cause the clip to grip excessively tighter as the spring is flexed, causing slippage and undue wear on the pressure side of the clip.

What I claim is:

1. The combination with a multiple leafspring, of a confining clip therefor, comprising a yoke and a bow-shaped member engaged on the ends of the yoke to engage the spring opposite the connecting portion of the yoke, said member having its bowed face in contact with the spring and being of convex form in cross-section to permit of rocking movement thereof on the spring and said member being adapted to co-operate with the yoke to exert a yielding binding pressure upon the spring leaves, and a rocker bearing member for said clip interposed between the connecting portion of the clip and the spring and anchored in a leaf of the spring to permit of rocking movement of the clip relative to the longitudinal movement of the spring leaves as the spring is flexed.

2. The combination with a multiple leafspring, of a confining clip therefor comprising a U-shaped member and a bowed spring member, respectively, said first-named member having a surface of curved form in cross-section and adapted to engage the sides and lower face of said spring and said second-named member having a convex surface contiguous to the upper face of the spring and adapted to engage the ends of the U-shaped member and also the upper face of said spring, said members co-operating to exert a yielding binding pressure of any desired predetermined degree upon the spring as a unit, and a rocker bearing member for said clip interposed between the U-shaped member and the lower face of the spring in opposed relation to the bowed spring member, said rocker bearing member being anchored on the spring and having a concaved bearing surface for engagement with the U-shaped member of a shallower arc than the convex contacting surface of the U-shaped member.

3. The combination with a multiple leaf-spring, of a clip therefor comprising two connecting members adapted to contact with and hold the sides of the spring laminations in vertical alignment and two cross members adapted to contact with the upper and lower faces of the spring, one of said cross members having its spring contacting surfaces of convex form in cross section and being of resilient material and bow shaped with the bowed surface adjacent the spring and adapted to exert a yielding binding pressure on the spring toward its face, and adjustable means for locking said connecting and cross members, respectively, to exert a yielding binding predetermined pressure upon the spring.

4. The combination with a multiple leaf-spring, of a clip therefor comprising two vertical connector members having threaded ends and adapted to contact with the sides of the spring laminations to hold them in alignment and two cross members adapted to contact with the outer spring leaves, one of said cross members being of resilient material and having a spring contacting surface of convex form intermediate its ends and from side to side, said member also having openings at its extremities surrounded with radial serrations and also being adapted to exert any desired predetermined yielding binding pressure on the spring leaves, and nuts having complementary serrations on their lower faces, said nuts being adapted to be threaded onto the ends of said connector members to lock the bowed member thereon to vary the pressure of said bowed member.

5. The combination with a spring having a plurality of spring leaves, of a clip for said spring comprising side members adapted to contact with the sides of the spring and upper and lower transverse members having convex surfaces adapted to have rolling contact with the upper and lower faces of the spring when the leaves of the spring move longitudinally of each other under flexure, one of said transverse members being bowed and of resilient material and adapted to co-operate with the side members and the other transverse member to exert any desired predetermined binding pressure on the spring, adjustable means for locking said side and transverse members in binding position, and a rocker bearing member interposed between the spring and the lower transverse member of the clip and adapted to engage the spring, said rocker member being provided with a protuberance for co-acting with a depression in the spring, to anchor the bearing and the clip to the spring.

In testimony whereof, I affix my signature.

ALBERT F. SHORE.